Patented Dec. 8, 1942

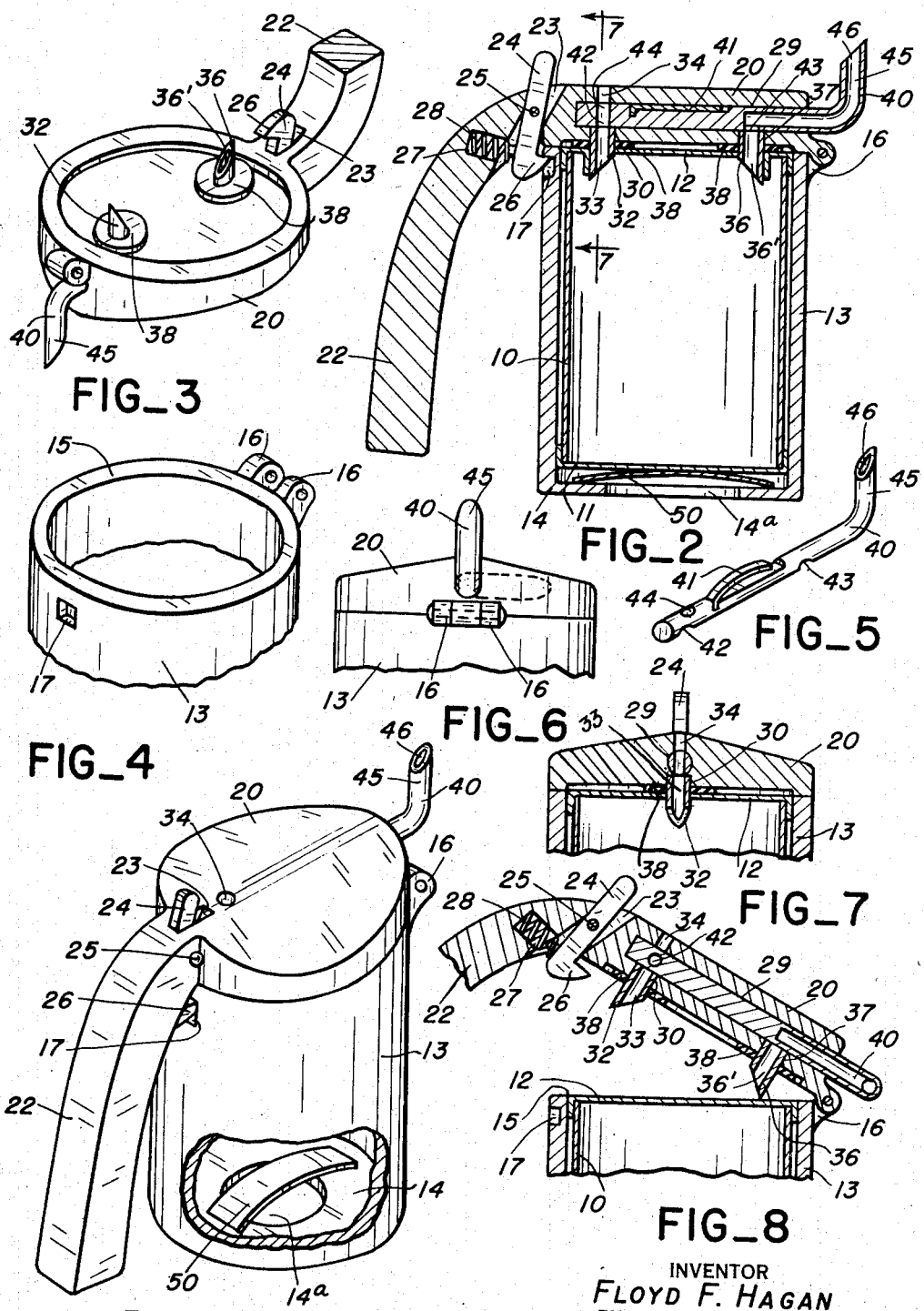

2,304,457

UNITED STATES PATENT OFFICE 2,304,457

DISPENSING MECHANISM

Floyd F. Hagan, Bremerton, Wash.

Application September 25, 1940, Serial No. 358,202

3 Claims. (Cl. 65—61)

My present invention relates to a dispensing mechanism for liquids which are distributed in metal containers. In the distribution of food products and particularly of liquids, many products are packed in cylindrical cans which are then sealed for the purposes of preservation during the distribution period.

Many of these food products when they reach the consumer may be kept in the container without removal therefrom except at such time as it is actually desired that they be dispensed, as in cooking or at the table. Take, for example, the well-known evaporated milk can in which the liquid is packed and delivered to the customer in a labeled container of cylindrical shape not having a high degree of esthetic beauty.

Undoubtedly the use of such condensed products would be greatly increased if an attractive and serviceable mechanism could be provided for supporting or enclosing the metallic container and for distributing the liquid from the container in a facile and attractive manner. Such a device must necessarily be easily disassembled for cleaning and equally as easily reassembled when placed back in use. At the same time it should include the minimum number of parts for purposes of keeping the cost of production as low as possible. In such a mechanism it is also deemed advisable to have means whereby the pouring spout will also serve as a handle to operate a closure valve for closing the vent opening and pouring opening of the container during such periods that the device is not in use.

An important object of my invention has been to provide an attachment for cooperative use with food containers which can be easily and quickly associated with the food container without the aid of tools and which, when the container is fully emptied, will also be easily removed therefrom.

A second object of my invention has been to provide a dispensing mechanism which includes perforating means for opening the food container when the mechanism is attached thereto.

Another object of my invention has been the provision of an attachment of the foregoing described class, having valve means which can be simply operated to seal or to open the vent and discharge openings of a container to the exterior thereof for the purpose of dispensing the liquid.

Still another object of the invention has been the provision of a valve mechanism of the foregoing nature which may be simply and easily removed from the attachment body for sterilization.

A further object of the invention has been the provision of a can puncturing and dispensing mechanism which also includes means for enclosing and supporting the can in close relation to the aforesaid dispensing means.

A still further object of the invention has been to provide an attachment of the class described which may be easily and simply manufactured and assembled and disassambled without the necessity of the person doing the assembling or disassembling being skilled as a mechanic.

Other objects and advantages of the invention will be apparent during the course of the following description, wherein I have illustrated in the several views a preferred form of my invention. Certain alterations and modifications of this preferred form of my invention may be made without departing therefrom, and it is believed they will be within the scope of this disclosure and of the subjoined claims at the end hereof.

Figure 1 is a perspective view of the can dispensing and puncturing means together with the container employed for enclosing a food can, a part being broken away to better illustrate its construction, Figure 2 is a vertical medial sectional view through the device of Figure 1, Figure 3 is an inverted, perspective view of the can puncturing mechanism with a portion of the handle omitted for convenience of illustration, Figure 4 is a fragmentary perspective view of the upper edge of the food container receiver, Figure 5 is a perspective view of the dispenser tube and valve mechanism, Figure 6 is a fragmentary elevational view as though looking from the right in Figure 2, Figure 7 is a vertical sectional view taken on line 7—7 of Figure 2, and Figure 8 is a fragmentary sectional view of the mechanism taken on a plane similar to Figure 2 and illustrating the manner in which the food container is punctured and the closure device is seated thereupon.

Referring to the drawings, throughout which like reference characters indicate like parts, the numeral 10 designates a food container having a bottom 11 and a top 12. Such food containers are ordinarily cylindrical, but of course any other shape may be used, and I do not wish to be limited in my invention to its adaptation to cylindrical food cans.

The can 10 is fitted within the receptacle 13 which has the bottom 14. The bottom 14 has an opening 14a therein. Adjacent the upper open end 15 I provide a pair of hinge lugs 16, 16.

Approximately diametrically opposite the lugs 16 is formed a recess or depression 17 which serves to receive a hook on a catch mechanism for retaining a lid or closure upon the opening 15.

The valve and dispensing head is designated as a whole by the numeral 20 and has on one edge depending or extending therefrom a handle 22. An opening 23 is adjacent the junction of the handle 22 and the body portion 20 and has inserted therein the lever 24 which is pivoted on pin 25. The lever has the hook 26 for engagement in the recess 17.

In a recess 27 the spring 28 is fitted and this spring operates against the bottom of the recess 27 and against the back side of the lever 24 in opposition to the hook 26 to constantly urge the hook to the right as shown in Figure 2.

In the body member 20 I form a transverse passage 29 and right angular vent and pouring passages communicate therewith. In the vent passage 30 I fit the cut puncturing member 32 having a sharp tapered puncturing portion. Member 32 has an inner bore 33 and this bore aligns with the vent passage 34 in the body 20.

Diametrically of the position of member 32 I provide a similar member 36 which is seated in the passage 37. Member 36 has an inner bore 36' which communicates with the passage 29 running transversely of the head 20. Gaskets 38, 38 encircle the members 32 and 36 for the purpose of sealing the opening which is punctured in the top of the container 10.

A distribution tube 40 is provided to fit within the opening or passage 29 and it has seated against its upper face the spring 41 for the purpose of maintaining it in tight fit within the bore 29. Of course, the tube 40 can be withdrawn from the bore very easily against the friction provided by the spring 41.

The tube 40 has openings 42 and 43 which communicate with or may be aligned with the bores in the members 32 and 36 respectively. Additionally the tube 40 is provided with the opening 44 which is adapted to align with the opening 34 in the body member 20.

Angularly arranged to the principal axis of the member 40 is the pouring spout 45 having a discharge opening 46. The tube 40 is not only longitudinally slidable in the opening 29 but also rotatable therein. When the pouring spout 45 is in a vertical position the openings 42, 43 and 44 are aligned with the openings 33, the bore 36' in the member 36 and the bore 34. By turning member 40 at right angles to the normal plane the openings may be sealed from each other to prevent venting of the can and the pouring of the contents.

A leaf spring 50, or other resilient means, may be employed in the bottom of the container receiver 13 to impart an upwardly directed urgence to the can 10. By thus pressing the can upwardly a more perfect seal around the punctures or openings formed therein is obtained. Also tension is maintained on the member 20 to keep the latch 24 seated and to prevent rattling or loose action. Additionally, such a spring as 50 will cause the can to be partially ejected when the catch or latch is loosened.

The foregoing description and the accompanying drawing are believed to clearly disclose a preferred embodiment of my invention, but it will be understood that this disclosure is merely illustrative and that such changes in the invention may be made as are fairly within the scope and spirit of the subjoined claims.

1. A dispenser device for containers comprising a dispenser head having a lateral passage and a vent passage intersecting said lateral passage, a pair of hollow container puncturing members on the under side of said dispenser head and communicating with said lateral passage, a distributor member rotatable in the lateral passage of said dispenser head, said distributor member having a longitudinal dispenser passage and a lateral vent passage, an angularly disposed pouring spout at the terminus of said dispenser passage, said longitudinal dispenser passage being alignable with one of said hollow container puncturing members and said lateral vent passage being simultaneously alignable with the intersecting vent passage in said dispenser head.

2. A dispenser device for containers comprising a dispenser head having a lateral passage and a vent passage intersecting said lateral passage, a pair of hollow container puncturing members on the under side of said dispenser head and communicating with said lateral passage, a distributor member rotatable in said dispenser head, said distributor member having a longitudinal dispenser passage and a lateral vent passage, said longitudinal dispenser passage being alignable with one of said hollow container puncturing members and said lateral vent passage being simultaneously alignable with the intersecting vent passage in said dispenser head.

3. The combination with a dispenser-head having a lateral passage, a vent passage intercepting the lateral passage and a tubular puncturing member mounted at the underside of the head and communicating with the vent passage, and a tubular puncturing member mounted at the underside of the head and communicating with the lateral passage, of a rotatable distributor member mounted in the lateral passage having a transverse opening adapted to align with the vent passage, said rotatable distributor member having a discharge passage and an outlet port adapted to align with the second tubular puncturing member, and resilient retaining means mounted on the distributor member in frictional engagement with the wall of the lateral passage.

FLOYD F. HAGAN.